May 13, 1941. G. T. PEARCE ET AL 2,241,886

TIRE TOOL

Filed Sept. 24, 1940

INVENTOR.
George T. Pearce &
Harold J. Leidel
BY
J Ralph Barrow

Patented May 13, 1941

2,241,886

UNITED STATES PATENT OFFICE 2,241,886

TIRE TOOL

George T. Pearce, Akron, and Harold J. Leidel, Wadsworth, Ohio, assignors to Ken-Tool Manufacturing Company, Akron, Ohio, a corporation of Ohio Application September 24, 1940, Serial No. 358,076

2 Claims. (Cl. 157—6)

This invention relates to tire tools, and in particular relates to tools for removing pneumatic tires from so-called safety drop-center rims of the type having annular ridges on the bead seats thereof engageable with the inner edges of the tire beads to lock the beads in position against the rim flanges.

In tire rims of the type described, the annular ridges on the bead seats are provided to prevent the tire beads from dropping into the drop-center well, should the tire mounted on the rim become deflated while running under load, these locking ridges being designed to minimize damage to the tire and reduce accidents caused by blowouts. Because of the relatively unyielding nature of the annular tire beads, however, it requires substantial pressure axially against the beads of the tire to force the same past the annular locking ridges and into the center well, for the purpose of removing the tire in the usual manner.

An object of this invention is to provide a simple, efficient tool for removing pneumatic tires with a minimum of effort from drop center rims of the type having annular locking ridges engageable with the inner edges of the tire beads.

Another object of the invention is to provide a tool of the character described which is adjustable to accommodate substantial variations in shapes and sizes of wheel assemblies and rims.

These and other objects of the invention will be manifest from the following brief description and the accompanying drawing.

Figure 1:
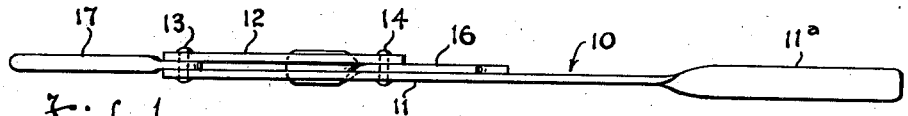
Figure 1 is a plan view of a tire tool embodying the invention.
Figure 2:
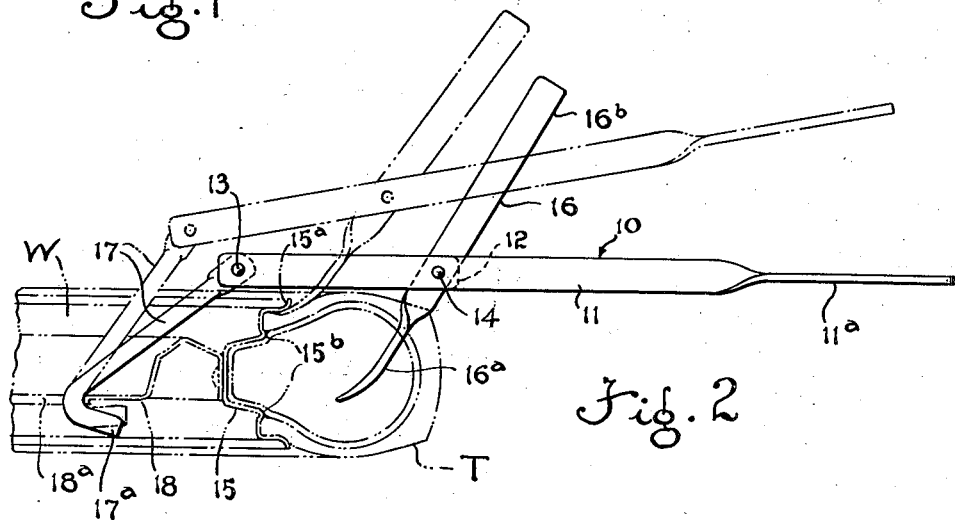
Figure 2 is a side elevation thereof, the initial application of the tool to a wheel assembly for removing a tire therefrom being shown in chain-dotted lines.

Referring to the drawing, the numeral 10 designates a lever which may be formed from a flat bar 11, twisted at one end to provide a suitable handle 11a, and a relatively shorter bar 12 maintained in spaced relation thereto by a pin 13 at the end of the lever remote from handle 11a, and a pin 14 in longitudinally spaced relation to pin 13, substantially as shown. Pivoted on pin 14, between bars 11 and 12, may be a flat bar 16 formed a tire-bead engaging member 16a extending at one side of said lever. The free end of member 16a may have a lip portion curving toward pin 13 for insertion between the bead portion of a tire T and the radial flange 15a of a drop-center rim 15 of a wheel assembly W, as illustrated in chain-dotted lines in Figure 2. Bar 16 may extend from pivot 14, at the other side of the lever from member 16a, to provide a handle 16b. Pivoted on end pin 13, between lever bars 11 and 12, so as to swing in the same plane as the bead-engaging member 16a, and at the same side of said lever as said member, may be an anchor rod 17 formed with a hooked portion 17a for engaging in hooked relation with the wheel hub 18 at the central opening 18a thereof, or with any other suitable portion or pojection of the wheel, to anchor the end of lever 11 for purposes to be described. The anchor bar 17, of course, may be shaped in other ways to suit changes in wheel construction.

Figure 3:
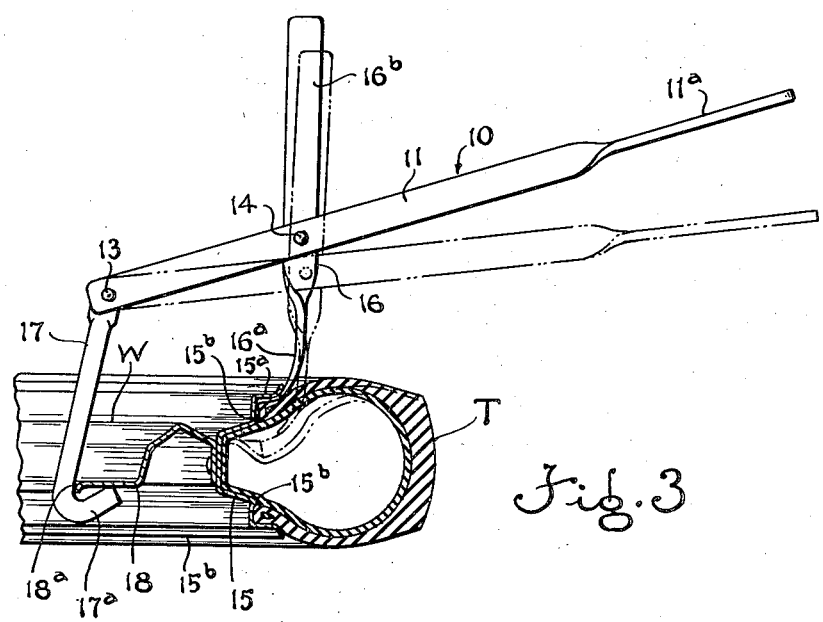
Figure 3 is a view similar to Figure 2, illustrating intermediate and final positions of use of the tool, in full lines and chain-dotted lines, respectively.

In the use of the invention for removing a tire, the wheel assembly, with tire T mounted thereon, is first placed on a horizontal surface, and the anchor rod 17 is hooked onto the hub 18 at the central opening 18a thereof. Next, by gripping lever handle 11a in the right hand of the operator, and handle 16a of bead engaging bar 16 in the left hand, the relative angular relation of the various elements of the tool may be shifted with respect to pivots 13 and 14 from the full line to the chain-dotted positions shown in Figure 2, in which the curved lip member 16a is urged between the bead of tire T and its rim flange 15a. As shown in the drawing, the anchor rod 17 is free to rock about its point of contact with wheel hub 18, to make the various adjustments of the tool. By urging handles 16a and 11a upwardly, substantially to the full line position shown in Figure 3, leverage is applied adjacent the lip of flange 15a to start the bead over the annular locking ridge or rib 15b. This brings the bar 16 to a substantially vertical position, and by applying downward leverage on handle 11a of lever 11, the latter being fulcrumed on anchor rod 17, the bead-engaging member 16a is urged downwardly to press the tire bead axially inwardly past the ridge 15b, around a substantial portion of its periphery, whereby said bead may be readily forced into the center well of the rim.

In operation of the tool the anchor rod 17 and the bead-engaging member 16a, both being pivoted on the lever 10, are free to swing relatively of the lever and relatively of each other. In other words, the pivots 13 and 14 are shiftable freely with the lever and with respect to the wheel assembly, so that respective parts of the tool may assume positions for most effective use thereof.

After the above process has been repeated to press the other tire bead over its locking ridge 15b and into the center well, the tire may be completely removed by using any suitable tire tool to force the beads over one rim flange, as will be understood by those skilled in the art.

Because of the jointed or collapsible nature of the tool, it may be readily adapted itself to a wide range of rim sizes and to various shapes of wheel hubs, by changing the relative angularity of the various elements of the tool.

Modifications of the invention may be resorted to provided they do not depart from the scope of the claims.

What is claimed is:

1. A tire tool of the character described, comprising a lever having a handle thereon, an element freely pivoted on said lever and having a hooked portion on the free end thereof engageable with a portion of a wheel assembly for a pneumatic tire when extended at one side of said lever, and a member freely pivoted on said lever in spaced relation from said element and having a portion for extending at the same side of the lever as said element to engage with a bead portion of a tire mounted on said wheel assembly, said member having a handle extending to the other side of said lever, the pivots on the lever both being shiftable freely with the lever and with respect to the wheel assembly whereby the element, member and lever may all shift relatively of each other during operation of the tool.

2. A tire tool of the character described, comprising a lever having a handle thereon, an element freely pivoted on said lever and having a hooked portion thereon engageable with a portion of a wheel assembly for a pneumatic tire when extended at one side of said lever, and a member freely pivoted on said lever in spaced relation from said element for extending from the same side of the lever as said element, said member having a lip portion on the free end thereof curving toward said element to engage with a bead portion of a tire mounted on said wheel assembly, said member having a handle extending to the other side of said lever, the pivots on the lever both being shiftable freely with the lever and with respect to the wheel assembly whereby the element, member and lever may all shift relatively of each other during operation of the tool.

GEORGE T. PEARCE.
HAROLD J. LEIDEL.